United States Patent
Zhao et al.

(10) Patent No.: US 10,129,828 B2
(45) Date of Patent: Nov. 13, 2018

(54) ROHC-BASED LINK ESTIMATION AND POWER SAVING IN VOLTE

(71) Applicant: Apple Inc., Cupertino, CA (US)

(72) Inventors: Yingjie Zhao, Pleasanton, CA (US); Li Su, San Jose, CA (US); Sreevalsan Vallath, Dublin, CA (US); Wanping Zhang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/257,629

(22) Filed: Sep. 6, 2016

(65) Prior Publication Data

US 2017/0171817 A1    Jun. 15, 2017

Related U.S. Application Data

(60) Provisional application No. 62/267,131, filed on Dec. 14, 2015.

(51) Int. Cl.
*G08C 17/00* (2006.01)
*H04W 52/02* (2009.01)
(Continued)

(52) U.S. Cl.
CPC ....... *H04W 52/0222* (2013.01); *H04L 5/0053* (2013.01); *H04W 72/048* (2013.01);
(Continued)

(58) Field of Classification Search
None
See application file for complete search history.

(56) References Cited

U.S. PATENT DOCUMENTS

| 6,529,730 B1 | 3/2003 | Komaili et al. |
| 8,064,383 B2 | 11/2011 | Koo et al. |

(Continued)

FOREIGN PATENT DOCUMENTS

| CN | 106332178 A | 11/2017 |
| WO | 2016/153548 | 9/2016 |

OTHER PUBLICATIONS

Search Report and Written Opinion for Patent Application No. PCT/US2016/063149, dated Feb. 16, 2017, 12 pages.

(Continued)

*Primary Examiner* — Phirin Sam
(74) *Attorney, Agent, or Firm* — Meyertons Hood Kivlin Kowert & Goetzel, P.C.; Jeffrey C. Hood

(57) ABSTRACT

A user equipment device (UE) may transmit, in a packet to a base station, information associated with resource configuration/resource requirement corresponding to wireless uplink communications of the wireless communication device. The base station may assign resources to the UE based on the received information. The UE may receive an uplink grant from the base station, with the uplink grant specifying resources for use by the wireless communication device during the uplink communications based on the information previously transmitted to the base station by the wireless communication device. The UE may send the packet at the time a voice call with the UE is initiated, and/or the UE may transmit the information during voice calls in response the UE changing one or more resource configuration parameters during the voice call. The UE may use Robust Header Compression packets of various types to transmit the resource configuration information.

20 Claims, 22 Drawing Sheets

(51) Int. Cl.
  *H04W 72/04*   (2009.01)
  *H04L 5/00*    (2006.01)
  *H04L 29/06*   (2006.01)
  *H04W 28/06*   (2009.01)

(52) U.S. Cl.
  CPC ....... *H04W 72/0413* (2013.01); *H04L 5/0007* (2013.01); *H04L 5/0044* (2013.01); *H04L 5/0087* (2013.01); *H04L 65/608* (2013.01); *H04L 69/04* (2013.01); *H04L 69/22* (2013.01); *H04W 28/06* (2013.01); *Y02D 70/00* (2018.01); *Y02D 70/1224* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/168* (2018.01); *Y02D 70/23* (2018.01); *Y02D 70/24* (2018.01); *Y02D 70/26* (2018.01)

(56) References Cited

U.S. PATENT DOCUMENTS

| | | | |
|---|---|---|---|
| 8,422,373 | B2 | 4/2013 | Alanara |
| 8,811,161 | B2 | 8/2014 | Lee et al. |
| 9,084,142 | B2 | 7/2015 | Barany et al. |
| 9,392,082 | B2 | 7/2016 | De Smet et al. |
| 2009/0034529 | A1 | 2/2009 | Dawdy |
| 2009/0046639 | A1 | 2/2009 | Cai et al. |
| 2010/0220673 | A1 | 9/2010 | Hui et al. |
| 2011/0158166 | A1* | 6/2011 | Lee ........................ H04W 28/06 370/328 |
| 2013/0322302 | A1* | 12/2013 | Gholmieh ............. H04W 36/24 370/280 |
| 2013/0322331 | A1* | 12/2013 | Ramkumar ........... H04W 28/10 370/328 |
| 2015/0049678 | A1 | 2/2015 | Speight |
| 2015/0305061 | A1* | 10/2015 | Feuersaenger .... H04W 72/1284 370/329 |
| 2015/0373584 | A1* | 12/2015 | Hong .................... H04W 28/08 370/329 |
| 2016/0183123 | A1 | 6/2016 | Chebolu |
| 2016/0212664 | A1* | 7/2016 | Uemura ................. H04W 24/08 |
| 2016/0226939 | A1* | 8/2016 | Kwak ................. H04L 65/4076 |
| 2016/0241685 | A1* | 8/2016 | Shah ....................... H04L 69/04 |
| 2016/0242193 | A1* | 8/2016 | Hong .................... H04W 76/10 |
| 2016/0270062 | A1 | 9/2016 | Dinan |
| 2016/0309364 | A1 | 10/2016 | Maheshwari et al. |
| 2017/0019930 | A1* | 1/2017 | Lee .................... H04W 74/0833 |
| 2017/0048857 | A1* | 2/2017 | Vajapeyam ........ H04W 72/0453 |
| 2017/0230096 | A1* | 8/2017 | Dinan .................. H04B 7/0617 |
| 2017/0325119 | A1* | 11/2017 | Lee .................... H04W 28/0268 |

OTHER PUBLICATIONS

International Search Report and Written Opinion, Application No. PCT/US2018/019523, dated May 25, 2018, 46 pages.

* cited by examiner

| Index | Buffer Size (BS) Value [bytes] |
|---|---|
| 0 | BS=0 |
| 1 | 0<BS<=10 |
| 2 | 10<BS<=12 |
| 3 | 12<BS<=14 |
| 4 | 14<BS<=17 |
| 5 | 17<BS<=19 |
| 6 | 19<BS<=22 |
| 7 | 22<BS<=26 |
| 8 | 26<BS<=31 |
| 9 | 31<BS<=36 |
| 10 | 36<BS<=42 |
| 11 | 42<BS<=49 |
| 12 | 49<BS<=57 |
| 13 | 57<BS<=67 |
| 14 | 67<BS<=78 |
| 15 | 78<BS<=91 |
| 16 | 91<BS<=107 |
| 17 | 107<BS<=125 |
| 18 | 125<BS<=146 |
| 19 | 146<BS<=171 |
| 20 | 171<BS<=200 |

FIG. 6

Composition of AMR-WB IF2 Frames for all Frame Types

| Frame Type Index | Frame Content | Number of Bits in Frame Type | Number of Bits in Frame Quality Indicator | Number of Bits in AMR-WB Core Frame | Number of Bits in Bit Stuffing | Number of Octets (N) |
|---|---|---|---|---|---|---|
| 0 | AMR-WB 6.60 kbit/s | 4 | 1 | 132 | 7 | 18 |
| 1 | AMR-WB 8.85 kbit/s | 4 | 1 | 177 | 2 | 23 |
| 2 | AMR-WB 12.65 kbit/s | 4 | 1 | 253 | 6 | 33 |
| 3 | AMR-WB 14.25 kbit/s | 4 | 1 | 285 | 6 | 37 |
| 4 | AMR-WB 15.85 kbit/s | 4 | 1 | 317 | 6 | 41 |
| 5 | AMR-WB 18.25 kbit/s | 4 | 1 | 365 | 6 | 47 |
| 6 | AMR-WB 19.85 kbit/s | 4 | 1 | 397 | 6 | 51 |
| 7 | AMR-WB 23.05 kbit/s | 4 | 1 | 461 | 6 | 59 |
| 8 | AMR-WB 23.85 kbit/s | 4 | 1 | 477 | 6 | 61 |
| 9 | AMR-WB SID (Comfort Noise Frame) | 4 | 1 | 40 | 3 | 6 |
| 10-13 | For Future Use | - | - | - | - | - |
| 14 | Speech Lost | 4 | 1 | 0 | 3 | 1 |
| 15 | No Data (No Transmission/ No Reception) | 4 | 1 | 0 | 3 | 1 |

FIG.11

| $I_{TBS}$ | 1 | 2 | 3 | 4 |
|---|---|---|---|---|
| 0 | 16 | | | |
| 1 | | 32 | 56 | 88 |
| 2 | 32 | 56 | 88 | 144 |
| 3 | 40 | 72 | 144 | 176 |
| 4 | 56 | 104 | 176 | 208 |
| 5 | 72 | 120 | 208 | 256 |
| 6 | 328 | 144 | 224 | 328 |
| 7 | 104 | 176 | 256 | 392 |
| 8 | 120 | 224 | 328 | 472 |
| 9 | 136 | 256 | 392 | 536 |
|   |     | 296 | 456 | 616 |

| AMR | Codec Bits | ROHC | RLC+PHY | Total | LTE Grant |
|---|---|---|---|---|---|
| AMR-WB 6.6K | 160 | 8 | 32 | 200 | 3RB, MCS4 |
| AMR-WB 8.85K | 200 | 8 | 32 | 240 | 2RB, MCS8 |
| AMR-WB 12.65K | 280 | 8 | 32 | 330 | 2RB, MCS9 |

FIG. 12

| 0 | 1 | 2 | 3 |
|---|---|---|---|
| 0 1 2 3 4 5 6 7 | 8 9 0 1 2 3 4 5 | 6 7 8 9 0 1 2 3 4 5 6 7 8 9 0 1 |
| 0x10 | 0x00 | Length=1 |
| ID=0x01 | L=2 | Data | Data |

FIG.16

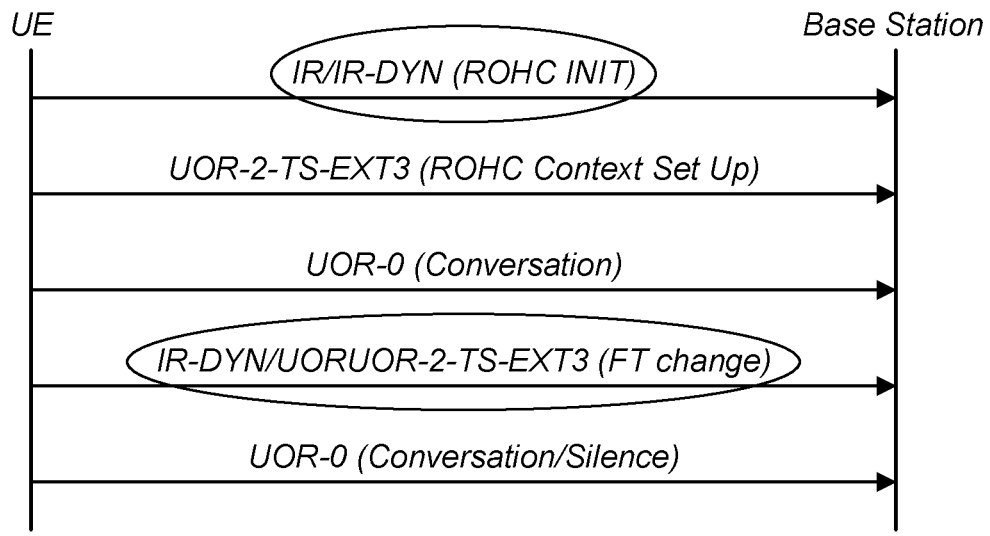
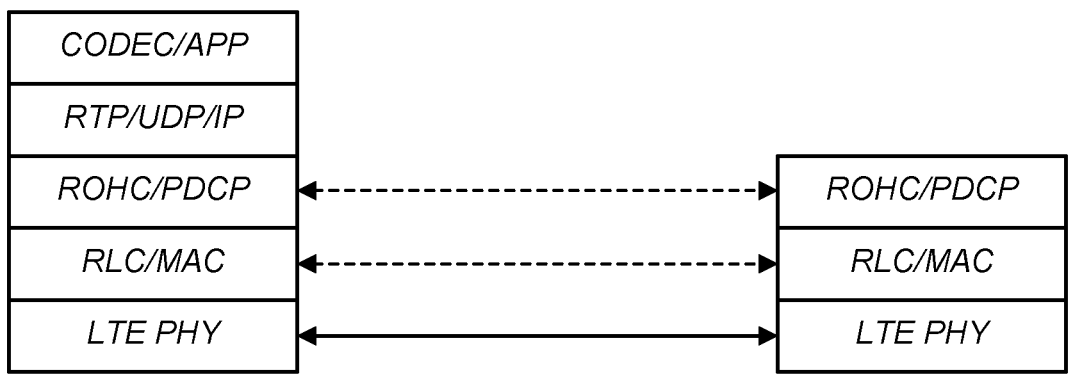
FIG. 20

AMR-WB Packet Size

| Frame Type Index | Frame Content | Number of Bits in Frame Type | Number of Bits in Frame Quality Indicator | Number of Bits in AMR-WB Core Frame | Number of Bits in Bit Stuffing | Number of Octets (N) |
|---|---|---|---|---|---|---|
| 0 | AMR-WB 6.60 kbit/s | 4 | 1 | 132 | 7 | 18 |
| 1 | AMR-WB 8.85 kbit/s | 4 | 1 | 177 | 2 | 23 |
| 2 | AMR-WB 12.65 kbit/s | 4 | 1 | 253 | 6 | 33 |
| 3 | AMR-WB 14.25 kbit/s | 4 | 1 | 285 | 6 | 37 |
| 4 | AMR-WB 15.85 kbit/s | 4 | 1 | 317 | 6 | 41 |
| 5 | AMR-WB 18.25 kbit/s | 4 | 1 | 365 | 6 | 47 |
| 6 | AMR-WB 19.85 kbit/s | 4 | 1 | 397 | 6 | 51 |
| 7 | AMR-WB 23.05 kbit/s | 4 | 1 | 461 | 6 | 59 |
| 8 | AMR-WB 23.85 kbit/s | 4 | 1 | 477 | 6 | 61 |
| 9 | AMR-WB SID (Comfort Noise Frame) | 4 | 1 | 40 | 3 | 6 |
| 10-13 | For Future Use | - | - | - | - | - |
| 14 | Speech Lost | 4 | 1 | 0 | 3 | 1 |
| 15 | No Data (No Transmission/ No Reception) | 4 | 1 | 0 | 3 | 1 |

FIG. 21

ROHC-BASED LINK ESTIMATION AND POWER SAVING IN VOLTE

PRIORITY CLAIM

This application claims benefit of priority of U.S. Provisional Patent Application Ser. No. 62/267,131 titled "ROHC-based Link Estimation and Power Saving in VoLTE", filed on Dec. 14, 2015, which is hereby incorporated by reference in its entirety as though fully and completely set forth herein.

FIELD OF THE INVENTION

The present application relates to wireless communications, and more particularly to ROHC-based link estimation and power saving during Voice over Long Term Evolution wireless communications.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), BLUETOOTH™, etc.

Various ones of the wireless communications standards, such as LTE, utilize packet switched networks. VoLTE, (Voice over LTE) provisions specific profiles for control and media planes of voice service delivered over LTE. The voice service (control and media planes) are delivered as data flows within the LTE data bearer. VoLTE has considerably higher voice and data capacity than other wireless protocols such as 3G UMTS and 2G GSM. Furthermore, VoLTE's smaller packet headers in comparison to unoptimized VoIP/LTE packets also frees up bandwidth.

Generally, during communications between mobile wireless communication devices or user terminals/devices (UE devices) and wireless networks (or base stations, e.g. eNBs), scheduling is used to designate time slots for uplink (UL) communications transmitted by the UE device to the base station. For uplink communications, the UE may first make a scheduling request to the base station. In response, the base station may respond with an uplink grant sent to the UE, granting the UE permission to transmit uplink data. In some cases scheduling can be fully dynamic, for example for infrequent and bandwidth consuming data transmissions which may result in large data bursts, e.g. web surfing, video streaming, emails. For real time streaming applications, such as voice calls, semi-persistent scheduling (SPS) can be used, whereby in the uplink, the SPS grant scheme is implicitly canceled if no data is sent for a network-configured number of empty uplink transmission opportunities, while in the downlink direction, SPS is canceled with an RRC (Radio Resource Control) message.

As noted above, the mobile wireless communication devices (or UEs) have no dedicated resources to transmit directly when receiving new data from a higher layer. Thus, a UE or UE device requests resources to transmit the data via a scheduling request to a base station (e.g. eNB) requesting the base station to grant resources to the UE. For most UE devices, efficient communications means better performance. For example, when power is limited, system performance may be improved if the resources granted by a base station to a UE device closely match the resources actually required by the UE device. Accordingly, improvements in the field, such as in resource allocation during wireless communications, are desirable.

SUMMARY OF THE INVENTION

Embodiments are presented herein of, inter alia, uplink grant resource allocations corresponding to wireless networks, e.g. packet data networks, and of devices that implement the methods. Embodiments are further presented herein for uplink grant solutions for wireless communication systems containing user equipment (UE) devices and base stations communicating with each other within the wireless communication systems.

In various embodiments, a wireless communication device may transmit in a packet to a base station resource configuration information associated with wireless uplink communications currently conducted or to be conducted by the wireless communication device. The wireless communication device may in turn receive an uplink grant[s] from the base station, with the uplink grant resources closely or exactly matching the resources requested by the wireless communication device in the resource configuration information transmitted by the wireless communication device to the base station. The UE device may send the packet at the time a voice call, e.g. VoLTE call is initiated, and also during voice calls (e.g. VoLTE calls) in response to the UE changing one or more resource parameters during the voice call. The UE may use Robust Header Compression packets of various types to transmit the resource request information.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

FIG. 6 shows an exemplary buffer size report table;

FIG. 11 shows an exemplary frame composition table for the composition of AMR-WB IF2 frames for all frame types;

FIG. 12 shows an exemplary mapping of payload to LTE grant, according to some embodiments;

FIG. 16 illustrates use of an extended RTP header to convey frame type and phone type information in the data field, according to some embodiments;

FIG. 20 shows an exemplary communication diagram illustrating when the mobile station may transmit grant change or specific resource configuration information to a base station, according to some embodiments;

FIG. 21 shows an exemplary table illustrating AMR-WB packet size information;

Figure 1:
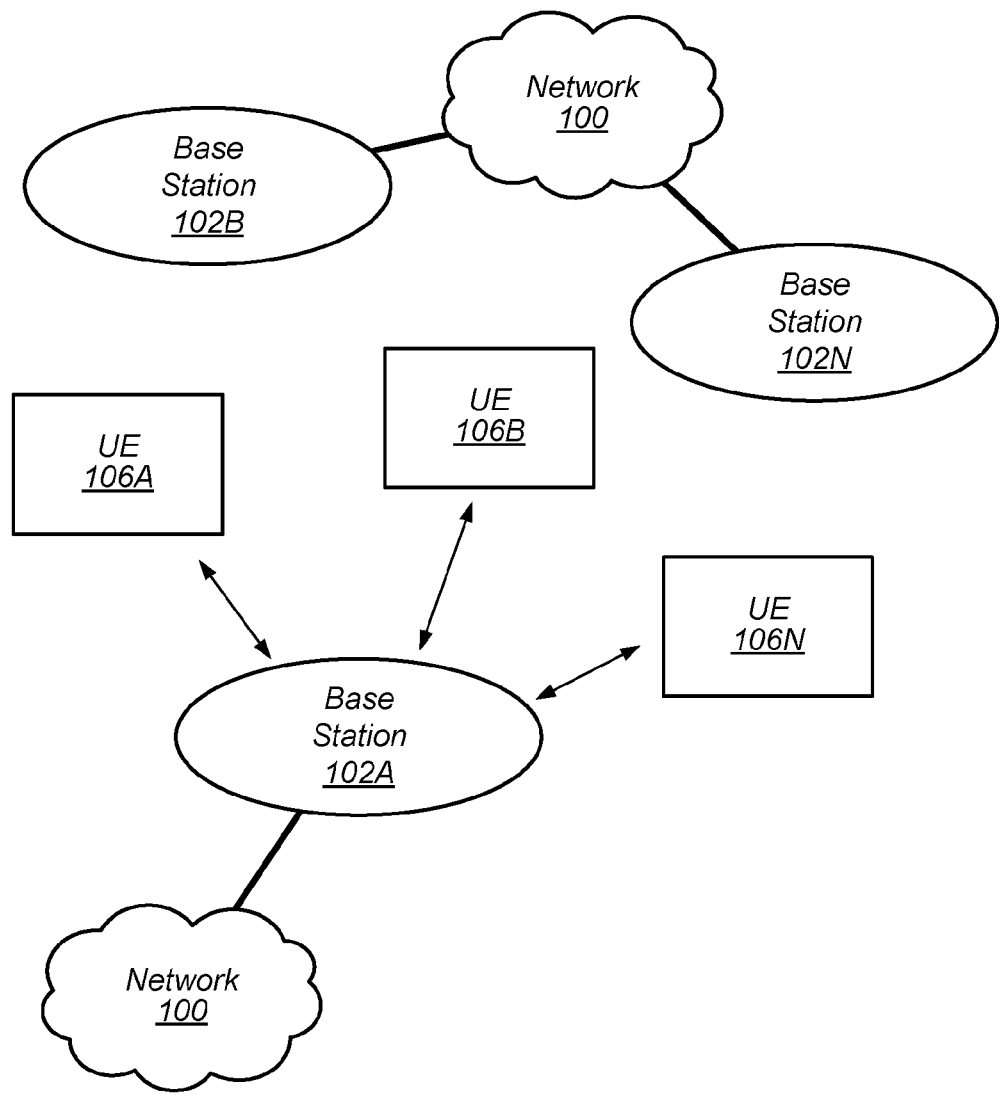
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

UE: User Equipment
RF: Radio Frequency
BS: Base Station
DL: Downlink (from BS to UE)
UL: Uplink (from UE to BS)
FDD: Frequency Division Duplexing
TDD: Time Division Duplexing
GSM: Global System for Mobile Communication
LTE: Long Term Evolution
TX: Transmission/Transmit
RX: Reception/Receive
UMTS: Universal Mobile Telecommunication System
LAN: Local Area Network
WLAN: Wireless LAN
AP: Access Point
APR: Applications Processor
APN: Access Point Name
GPRS: General Packet Radio Service
GTP: GPRS Tunneling Protocol
PDN: Packet Data Network
PGW: PDN Gateway
SGW: Serving Gateway
RAT: Radio Access Technology
Wi-Fi: Wireless Local Area Network (WLAN) RAT based on the Institute of Electrical and Electronics Engineers' (IEEE) 802.11 standards
PDCP: Packet Data Convergence Protocol
BSR: Buffer Size Report
CMR: Change Mode Request
TBS: Transport Block Size
ROHC: Robust Header Compression
SID: System Identification Number
PDU: Protocol Data Unit
PT: Payload Type
FT: Frame Type
AMR-WB: Adaptive Multi-Rate Wideband
RTP: Real-time Transport Protocol
IR: Initialization and Refresh state
FO: First-Order state
DYN: Dynamic Terms The following is a glossary of terms that may appear in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which are mobile or portable and which performs wireless communications. Also referred to as wireless communication devices. Examples of UE devices include mobile telephones or smart phones (e.g., iPhone™, Android™-based phones) and tablet computers such as iPad™ Samsung Galaxy™, etc., portable gaming devices (e.g., Nintendo DS™, PlayStation Portable™, Gameboy Advance™, iPod™), laptops, wearable devices (e.g. Apple Watch™, Google Glass™) PDAs, portable Internet devices, music players, data storage devices, or other handheld devices, etc. Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is easily transported by a user and capable of wireless communication.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, various analog and/or digital circuitry, circuits such as an ASIC (Application Specific Integrated Circuit), programmable hardware elements such as a field programmable gate array (FPGA), as well any of various combinations of the above.

Wireless Device (or wireless communication device)—any of various types of computer systems devices which performs wireless communications using WLAN communications, SRAT communications, Wi-Fi communications and the like. As used herein, the term "wireless device" may refer to a UE device, as defined above, or to a stationary device, such as a stationary wireless client or a wireless base station. For example a wireless device may be any type of wireless station of an 802.11 system, such as an access point (AP) or a client station (UE), or any type of wireless station of a cellular communication system communicating according to a cellular radio access technology (e.g. LTE, CDMA, GSM), such as a base station or a cellular telephone, for example.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

BLUETOOTH™—The term "BLUETOOTH™" has the full breadth of its ordinary meaning, and at least includes any of the various implementations of the Bluetooth standard, including Bluetooth Low Energy (BTLE) and Bluetooth Low Energy for Audio (BTLEA), including future implementations of the Bluetooth standard, among others.

Personal Area Network—The term "Personal Area Network" has the full breadth of its ordinary meaning, and at least includes any of various types of computer networks used for data transmission among devices such as computers, phones, tablets and input/output devices. Bluetooth is one example of a personal area network. A PAN is an example of a short range wireless communication technology.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Station (STA)—The term "station" herein refers to any device that has the capability of communicating wirelessly, e.g. by using the 802.11 protocol. A station may be a laptop, a desktop PC, PDA, access point or Wi-Fi phone or any type of device similar to a UE. An STA may be fixed, mobile, portable or wearable. Generally in wireless networking terminology, a station (STA) broadly encompasses any device with wireless communication capabilities, and the terms station (STA), wireless client (UE) and node (BS) are therefore often used interchangeably.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
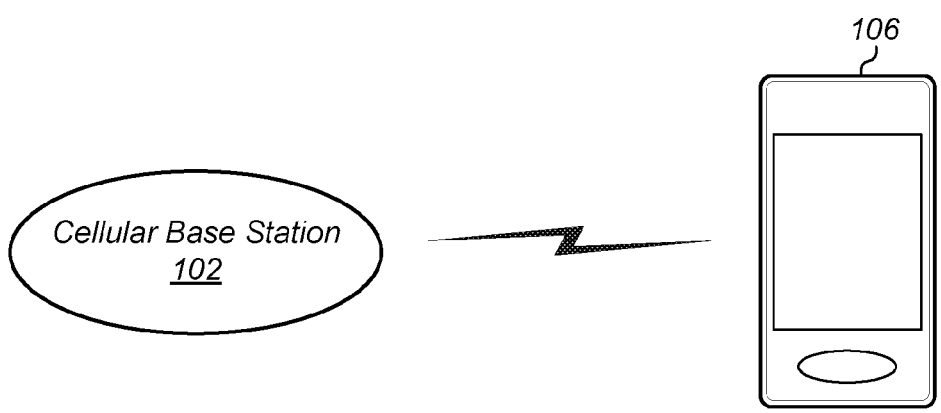
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more user devices 106-1 through 106-N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware that enables wireless communication with the UEs 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), 3GPP2 CDMA2000 (e.g., 1xRTT, 1xEV-DO, HRPD, eHRPD), Wi-Fi, WiMAX etc. In some embodiments, the base station 102 communicates with at least one UE using improved UL (Uplink) and DL (Downlink) decoupling, preferably through LTE or a similar RAT standard.

UE 106 may be capable of communicating using multiple wireless communication standards. For example, a UE 106 might be configured to communicate using either or both of a 3GPP cellular communication standard (such as LTE) or a 3GPP2 cellular communication standard (such as a cellular communication standard in the CDMA2000 family of cellular communication standards). In some embodiments, the UE 106 may be configured to communicate with base station 102 using ROHC-based link estimation and power savings as described herein. Base station 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates an exemplary user equipment 106 (e.g., one of the devices 106-1 through 106-N) in communication with the base station 102, according to some embodiments. The UE 106 may be a device with wireless network connectivity such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. In some embodiments, the UE 106 may include any processing element(s) that perform any of the method embodiments described herein. For example, the UE 106 may include any one or more of a processor, FPGA, custom circuitry, application specific integrated circuit and/or system on a chip interoperating to execute/perform any of the method embodiments described herein. The UE 106 may be configured to communicate using any of multiple wireless communication protocols. For example, the UE 106 may be configured to communicate using two or more of CDMA2000, LTE, LTE-A, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios which are shared between multiple wireless communication protocols, and one or more radios which are used exclusively by a single wireless communication protocol. For example, the UE 106 may include a shared radio for communicating using either of LTE or CDMA2000 1xRTT, and separate radios for communicating using each of Wi-Fi and BLUETOOTH™. Other configurations are also possible.

Figure 3:
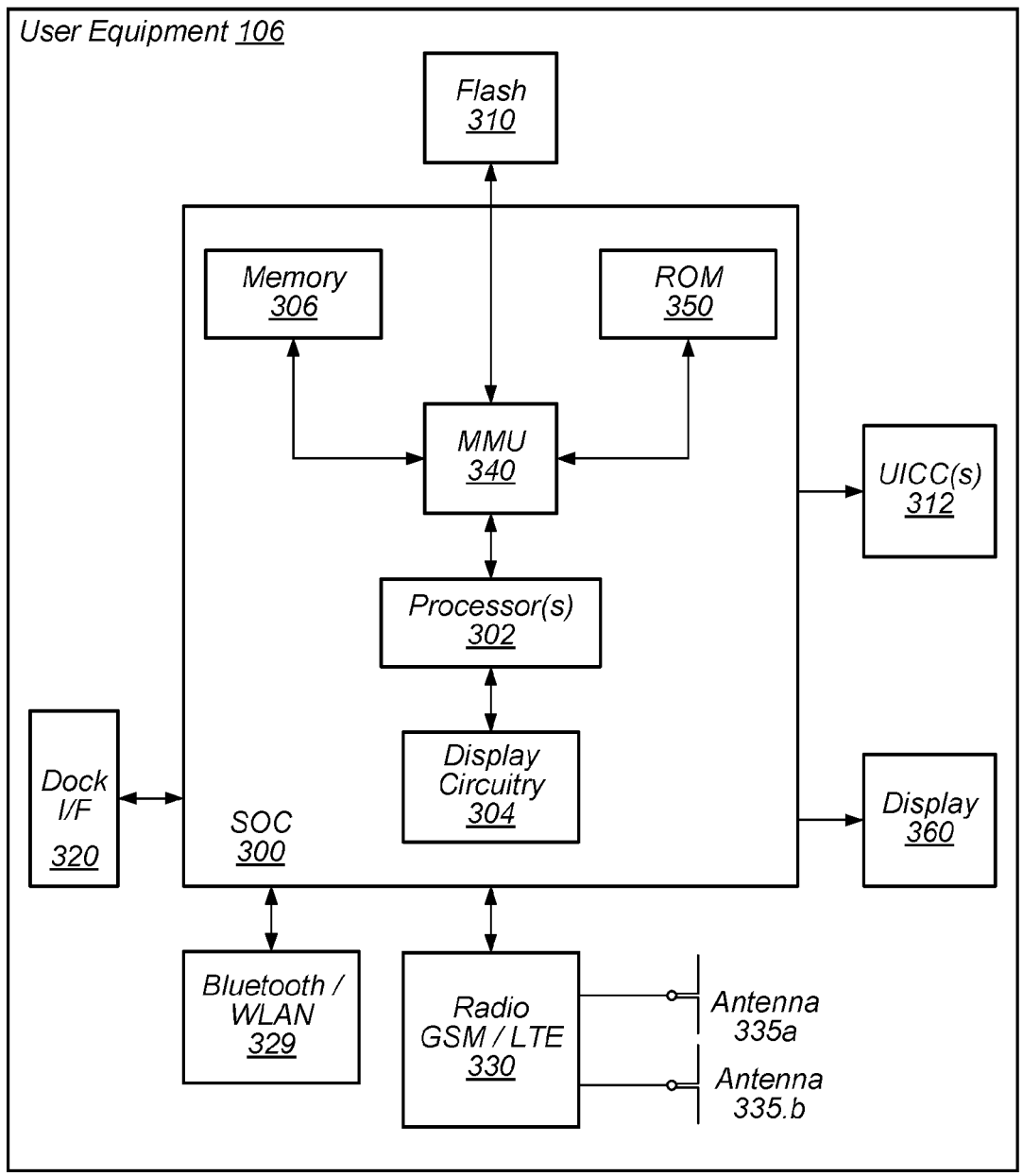
FIG. 3 illustrates an exemplary block diagram of a UE, according to some embodiments.

FIG. 3—Block Diagram of an Exemplary UE

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 340, and wireless communication circuitry (e.g., for LTE, LTE-A, CDMA2000, BLUETOOTH™, Wi-Fi, GPS, etc.). The UE device 106 may include at least one antenna (e.g. 335*a*), and possibly multiple antennas (e.g. illustrated by antennas 335*a* and 335*b*), for performing wireless communication with base stations and/or other devices. Antennas 335*a* and 335*b* are shown by way of example, and UE device 106 may include more antennas. Overall, the one or more antennas (including 335*a* and 335*b*) are collectively referred to as antenna(s) 335. For example, the UE device 106 may use antenna(s) 335 to perform the wireless communication with the aid of radio circuitry 330. As noted above, the UE may be configured to communicate wirelessly using multiple wireless communication standards in some embodiments.

As further described herein, the UE 106 (and/or base station 102) may include hardware and software components for implementing methods for ROHC based link estimation and power savings. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to implement communications by UE 106 that incorporates improved link estimation and power saving according to various embodiments disclosed herein. Specifically, processor(s) 302 may be coupled to and/or may interoperate with other components as shown in FIG. 3 to facilitate UE 106 communicating various uplink grant requirements to the network (e.g. to base station 102) in order for base station 102 to provide UL grants that more closely and accurately match actual data requirements of UE 106. Processor(s) 302 may also implement various other applications and/or end-user applications running on UE 106.

In some embodiments, radio 330 may be included with separate additional radio controllers such as BLUETOOTH™/WLAN controller 329. For example, as shown in FIG. 3, radio 330 may include a cellular controller (e.g. LTE controller), while radio controller 329 may include a BLUETOOTH™ controller and/or WLAN controller. In at least some embodiments, one or more or all of these controllers may be implemented as respective integrated circuits (ICs or chips, for short) in communication with each other and with SOC 300 (and more specifically with processor(s) 302) as will be further described below. For example, a Wi-Fi controller may communicate with a cellular controller over a cell-ISM link or WCI interface, and/or BLUETOOTH™ controller may communicate with cellular controller over a cell-ISM link, etc. While two separate radio controllers are illustrated in FIG. 3, other embodiments may have fewer or more similar controllers for various different RATs that may be implemented in UE device 106.

Figure 4:
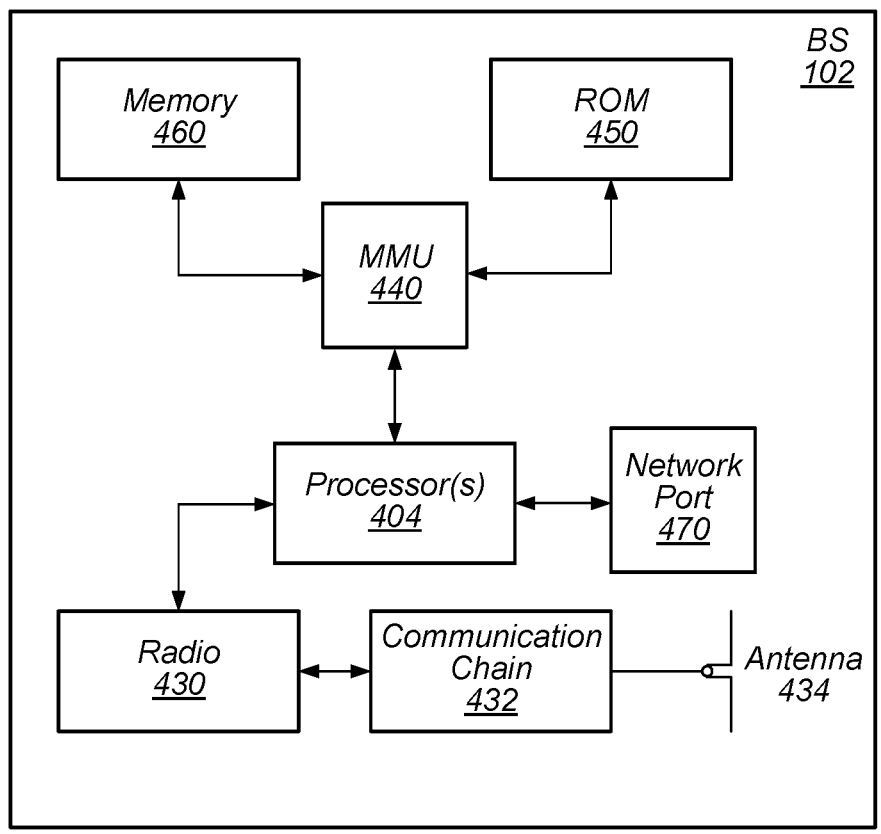
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be designed to communicate via various wireless telecommunication standards, including, but not limited to, LTE, LTE-A WCDMA, CDMA2000, etc. The processor 404 of the base station 102 may be configured to implement part or all of the methods described herein for base station 102 to issue UL grants that more accurately and closely match actual data requirements of a UE device, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. Base station 102 may operate according to the various methods as disclosed herein for providing more accurate UL grants to mobile devices.

Link Estimate Issues

As previously mentioned, UEs have no dedicated resources over which to transmit directly when receiving new data from a higher layer. Thus, a UE device typically requests resources (to transmit the data) via a scheduling request to a base station (e.g. eNB), requesting the base station to grant resources to the UE. The base station in turn transmits UL grants to the UE device. However, the base station (eNB) has no information about the CODEC type and transmission mode currently used on the dedicated radio bearer. Therefore, the eNB typically estimates the packet size based on historical information of past packet transmissions. There are drawbacks to the base station estimating the resource requirements for the UE. For example, if the grant assigned by the base station exceeds the UE's requirements, e.g. the granted packet size is larger than the size of an actual packet (e.g. voice packet) transmitted by the UE, the UE needs to add padding bits in the packets, thereby wasting UE transmit power. If the resources granted by the base station are insufficient, e.g. the granted packet size is smaller than the size of an actual packet transmitted by the UE, the UE may need to perform one or more operations directed to rectifying this disparity. For example, in case of voice packet the UE may have to perform RLC segmentation on the voice packet, which increases the probability of voice packets being dropped during transmission, incurring more UE transmissions and further wasting UE transmit power. Especially in a weak coverage area, when power is limited, system performance may be greatly optimized by having the grant transmitted by the base station matching the UE requirements. E.g., the base station granting a packet size that more closely (or even completely) matches the size of the actual packet (e.g. voice packet) that the UE is transmitting can optimize the overall system performance and allows the UE to transmit more efficiently.

FIG. 6 shows an exemplary buffer size report table associated with some wireless transmissions. As indicated in the table, the MAC (Media Access Control) layer BSR (Buffer Size Report) provides information with limited accuracy. A BSR-based estimate can waste base station resources and may potentially introduce additional delay. For example, in an exemplary wireless communication scenario, the UE may transmit a SR (Scheduling Request) at subframe n, receive a small grant at subframe n+4, transmit the first small packet at subframe n+8, receive the additional grant at subframe n+10, and transmit a voice packet at subframe n+14. The delay may be even longer in a TDD (Time Division Duplex) system. Furthermore, the BSR granularity is not fine. For example, during a 40 ms C-DRX (Connected-Mode Discontinuous Reception) cycle, the typical packet size is 84 bytes, and BSR granularity is 14. This is illustrated in FIG. 6 at index 14 where the BS value is between 67 and 78, while at index value 15 the BS value is between 78 and 91.

There may also be a variety of reasons why the base station (UL) grant prediction may not be accurate. The base station uses historical TBS (Transport Block Size) information to estimate the next TBS. In other words, the base station may track the TBS over a number of transmissions and/or a specified communication period to estimate what the TBS may be for future transmissions. Consequently, the base station relies on at least a specified number of received packets to make grant predictions, and typically predicts required frame type changes after the frame type has already changed. In addition, the base station also needs to estimate granularity, for which it may be very difficult to provide an accurate estimate. Furthermore, the UE may change the packet size (e.g. voice packet size) during a VoLTE session, the CODEC type may change during the session, and the frame type may also change. The SID (System Identification Number) packet is very small, making it difficult for the base station to ramp up and down quickly. VoLTE packet payload may be characterized by the following:

For one payload type and frame type, the voice packet size is fixed

The size of each type of ROHC Packet header is also fixed

Figure 7:
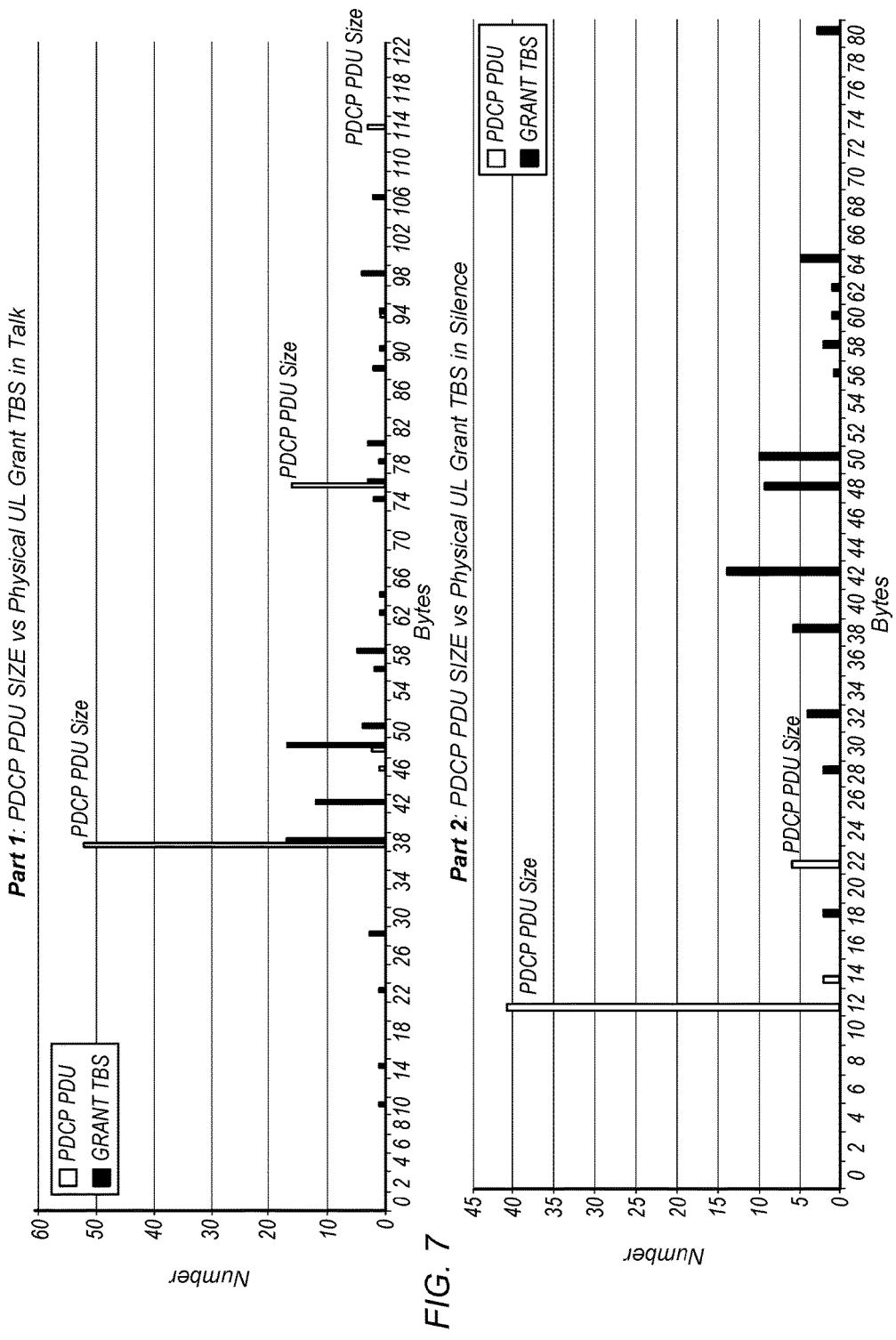
FIG. 7 shows graphs illustrating exemplary PDCP PDU size vs. Physical UL Grant TBS during talk and during silence, respectively.
Figure 8:
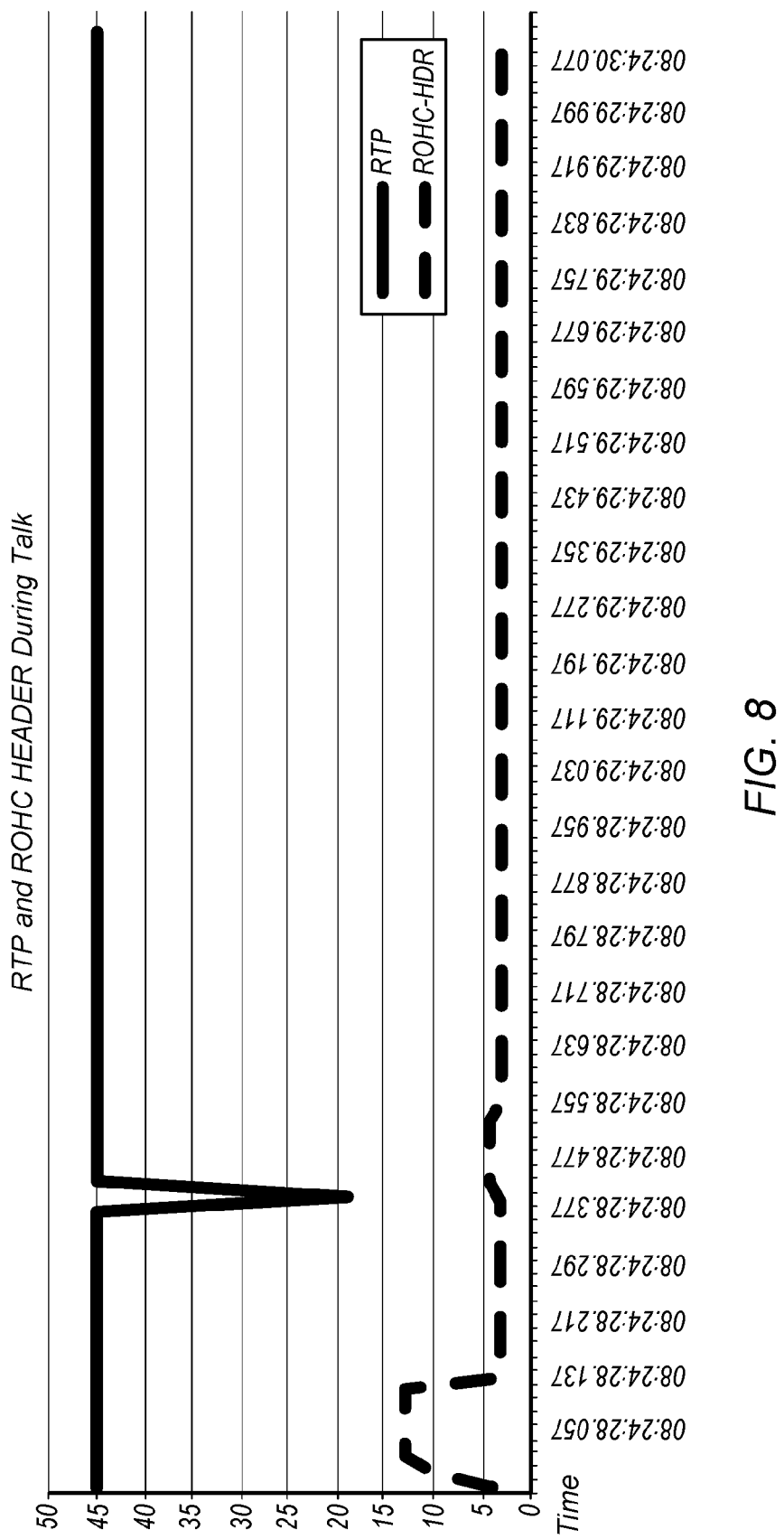
FIG. 8 shows a graph illustrating exemplary RTP and ROHC header during talk.
Figure 9:
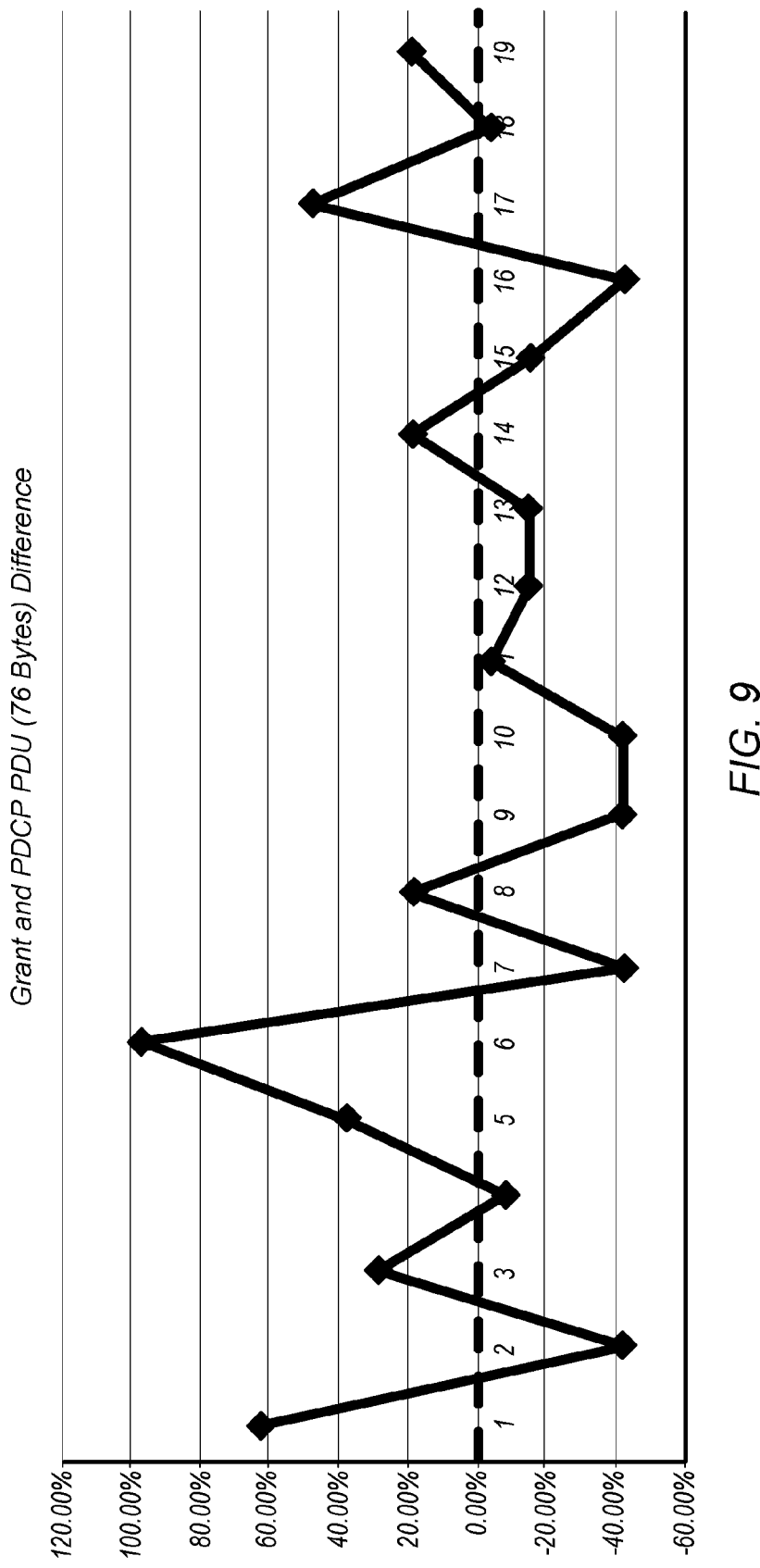
FIG. 9 shows a graph illustrating exemplary differences between grant data packet size and actual data packet size requirements, respectively.
Figure 10:
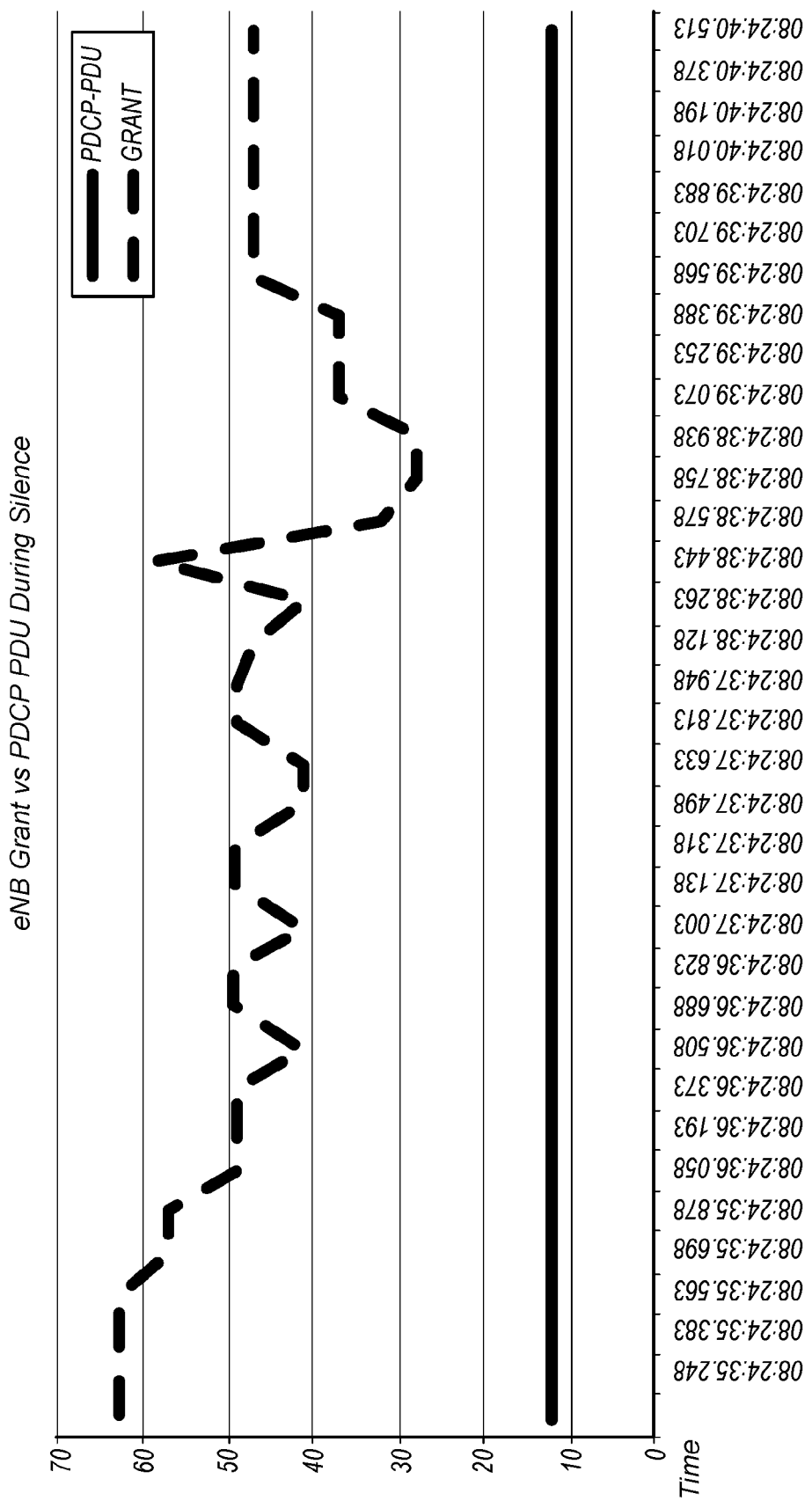
FIG. 10 shows a graph illustrating exemplary eNB grant vs. PDCP PDU during silence.

With the above packet information, the network may provide accurate Uplink Grants FIG. 7 (part 1 and part 2) shows graphs illustrating an example of present (typical) base station UL link prediction. The graph in FIG. 7, part 1 shows the PDCP PDU size vs. the physical UL grant TBS during Talk. As clearly seen in the graph, the PDCP PDU size differs considerably from the Grant TBS. The graph in FIG. 7, part 2 shows the PDCP PDU size vs. Physical UL Grant TBS during Silence. Again, the Grant TBS differs from the actual PDU. FIGS. 8 and 9 show graphs illustrating additional examples of present (typical) base station UL link prediction. More specifically, FIG. 8 shows a graph that illustrates the RTP (Real-time Transport Protocol) and the ROHC (Robust Header Compression) packet header during Talk, while FIG. 9 shows a graph that illustrates the differences between grant data packet size and actual data packet size requirements, according to one example. The graph plots the percentage (%) difference between the Grant PDU and the actual data requirements. Another example is provided in FIG. 10, which shows a graph illustrating the eNB grant vs. PDCP (Packet Data Convergence Protocol) PDU during silence.

Uplink Grants that More Accurately Match UE Requirements

In some embodiments, more accurate UL grants may be achieved by the UE using one or more selected fields in the ROHC packet header to update the base station about various resource requirements and associated information. For example, the UE may use one or more selected fields in the ROHC packet header to update the base station about current codec type and/or format type. ROHC (Robust Header Compression) is used to compress overhead bytes in a packet into typically one or three bytes by placing a compressor before a given link having limited capacity, and placing a decompressor after the given link. The compressor converts the large overhead to a few bytes, while the decompressor performs the corresponding inverse operation. The ROHC compression scheme generally performs well over links where the packet loss rate is high, such as wireless links. ROHC has three modes of operation: a unidirectional mode (U-mode), a bidirectional optimistic mode (0-mode), and a bidirectional reliable mode (R-mode). Both the compressor and the decompressor start in U-mode, and may then transition to 0-mode if a usable return link is available, and the decompressor sends a positive acknowledgement, with 0-mode specified, to the compressor. The transition to R-mode is achieved in the same way. The ROHC compressor defines three states: the Initialization and Refresh (IR) State, the First Order (FO) State, and Second Order (SO) State. ROHC packets and various packet types may be formed corresponding/according to the various modes and states described above.

Accordingly, in one set of embodiments, a specified number of parameters and/or information may be carried in an ROHC header to update the base station about various resource requirements of the UE to enable the base station to provide more accurate UL grants. In some embodiments, a first parameter (PT—Payload Type) may be used to indicate the CODEC type, such as AMR-WB, AMR for example, and a second parameter (FT—Frame Type) may be used to indicate the type of frame, such as 12.65 kbps for example. When provided with PT and FT information, the base station may become aware of the packet size currently used by the UE on a dedicated bearer.

FIG. 11 shows an exemplary frame composition table (from ETSI TS26.201) for the composition of AMR-WB IF2 frames for all frame types. As highlighted in the table, for AMR-WB FT=2, the (voice) packet size is 33 bytes. Information shown in the table in FIG. 11 may be communicated by the UE, as applicable, to the base station to indicate the composition (requirement[s]) of AMR-WB IF2 frames to the base station.

In some embodiments, the payload may be mapped to the LTE grant as illustrated in FIG. 12, which shows an exemplary mapping of the payload to LTE grant, according to some embodiments. The numbers atop each column in the table on the left represent the number of resource blocks, respectively. When the CODEC Payload is carried by RTP, the RTP may add a 2-byte payload header. A UO-0 ROHC header is 1 byte. In VoLTE, the physical layer packet size of voice stream is a fixed value. The NW (or base station; eNB) may thus select the most efficient TBS to carry the voice packet.

First Examples of Packet-Delivered Resource Request Information

Figure 13:
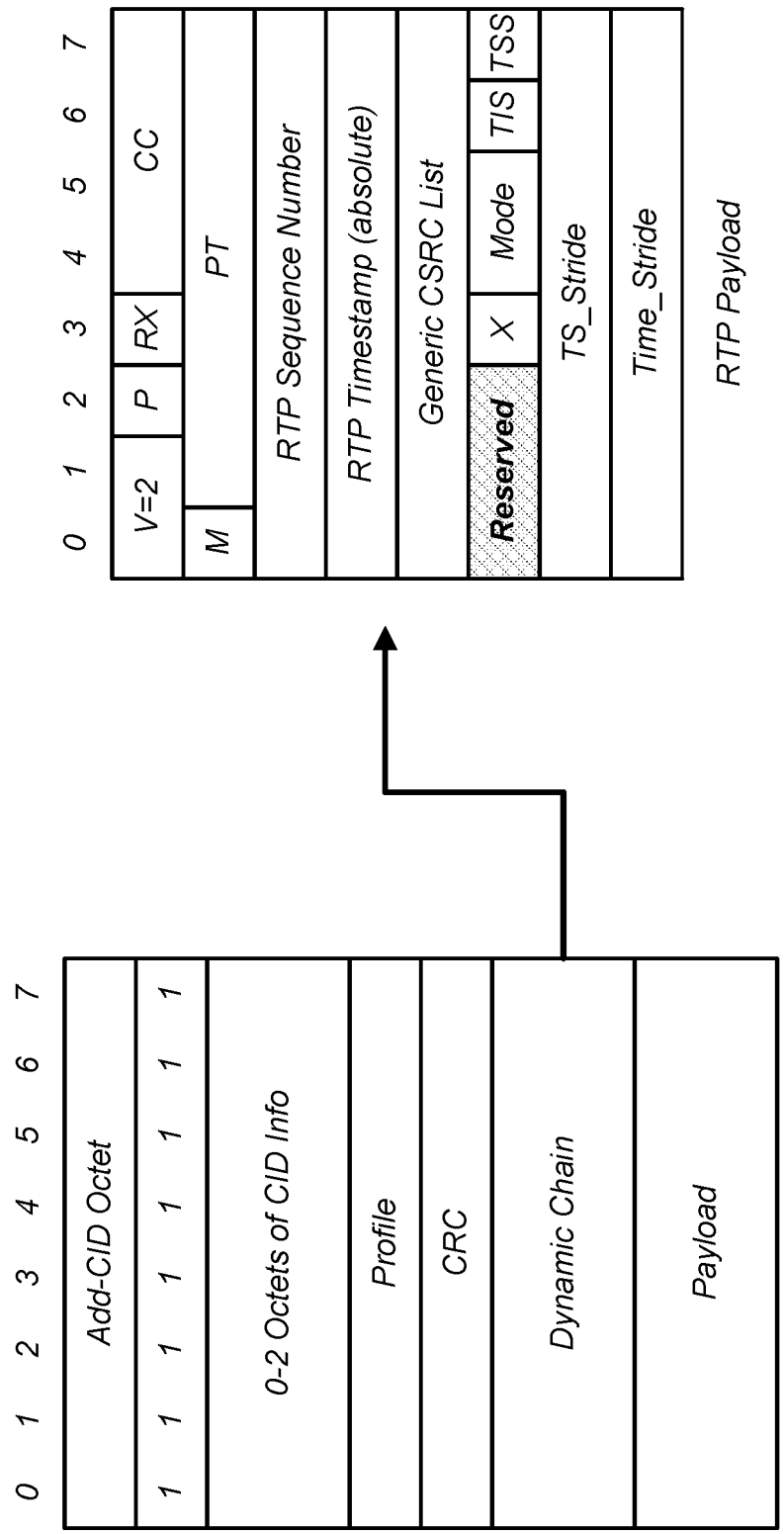
FIG. 13 illustrates use of a standard RTP header using the dynamic chain segment of an IR-DYN header and RTP payload header to update CODEC type, rate and phone type, respectively, according to some embodiments.
Figure 14:
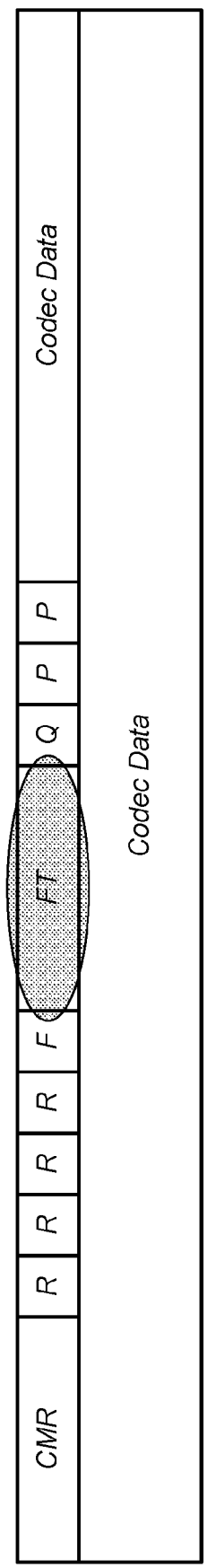
FIG. 14 shows an RTP packet payload carrying Frame Type information, according to some embodiments.

FIG. 13 illustrates use of a standard RTP header in an IR-DYN header dynamic chain segment and RTP payload header that may be used to update CODEC type, rate and phone type, respectively, according to some embodiments. As shown in FIG. 13, a standard RTP header in an IR-DYN header dynamic (chain) segment may be used to update the PT parameter. A specified number of reserved bits (indicated as "Reserved" in the expanded Dynamic Chain portion of the packet shown on the right) may be used to communicate phone type. For example, in some embodiments, the three reserved bits may be set to "010" to indicate the Phone type of "iPhone". If the base station receives an IR-DYN packet, the base station may read the RTP encapsulation header to read the FT parameter. FIG. 14 shows an RTP packet payload carrying Frame Type information (circled), according to some embodiments.

Second Examples of Packet-Delivered Resource Request Information

Figure 15:
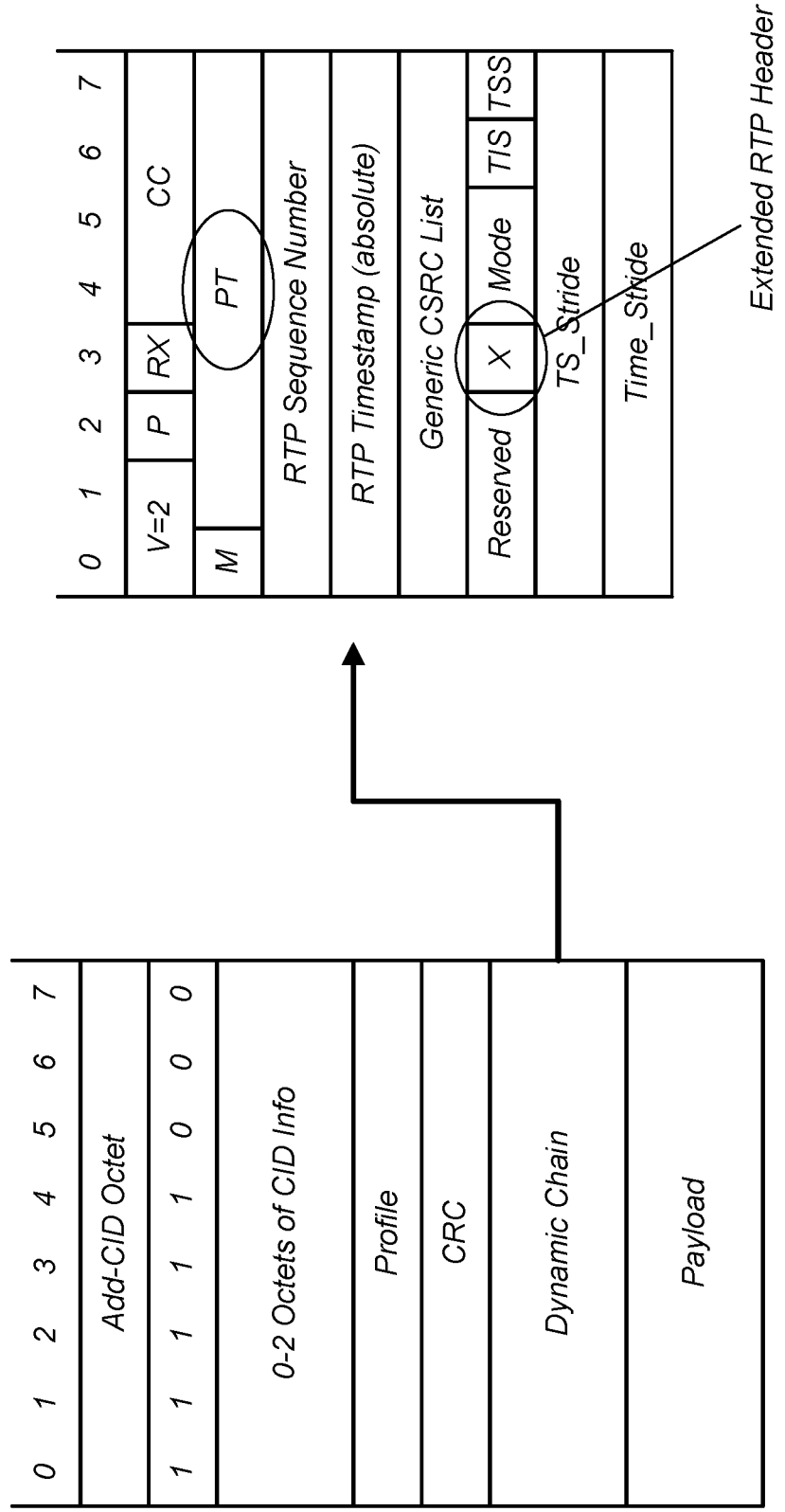
FIG. 15 illustrates use of a standard RTP header using the dynamic chain segment of an ROHC IR-DYN header to update the payload type parameter, according to some embodiments.

FIG. 15 illustrates use of a standard RTP header using the dynamic chain segment of an ROHC IR-DYN header to update the payload type parameter, according to some embodiments. The UE may inform the base station about the code type and rate when initiating a VoLTE call. The UE may use a standard RTP header in the ROHC IR-DYN header dynamic segment (expanded on the right hand side in FIG. 15) to update the PT parameter and communicate the update to the base station (e.g. to the eNB). In some embodiments, the UE and the base station may support RFC 5285, and use a standard extended RTP header in the ROHC IR-DYN header dynamic segment to update frame type and phone type parameter information, as illustrated in FIG. 15.

FIG. 16 illustrates use of an extended RTP header that may be used to convey frame type and phone type information in the data field, according to some embodiments. A 2-byte extended header format may be used. The ID may be assigned to be a specified value in the extended header when communicating FT and/or phone type information. For example, ID may be set to 0x01 for this feature (note: an RFC—Request for Comments—may be submitted to the IETF—Internet Engineering Task Force—to reserve the number). The ID may also be negotiated with SDP (RFC 5285). Overall, the format of Frame-Type/Phone-Type may be defined in the data field as illustrated in FIG. 16.

Figure 17:
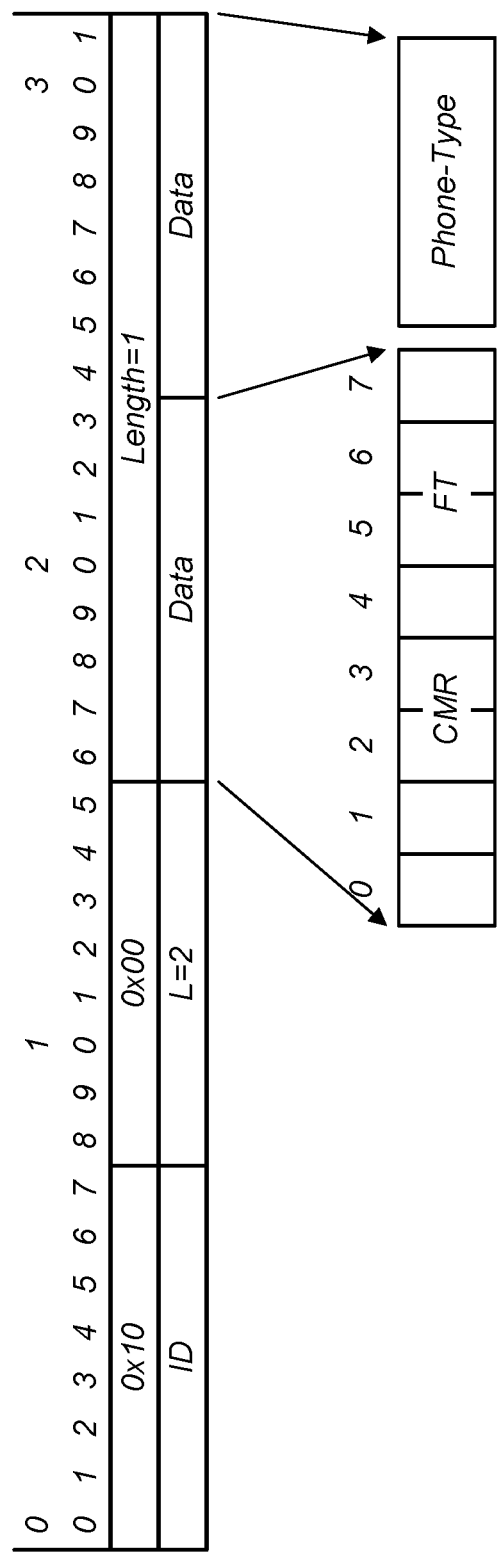
FIG. 17 illustrates use of an extended RTP header to convey frame type, phone type and change mode request information in the data field, according to some embodiments.

FIG. 17 illustrates use of an extended RTP header that may be used to convey frame type, phone type and change mode request information in the data field, according to some embodiments. In the embodiments exemplified in FIG. 17, the CMR (Change Mode Request) and FT may be included in the data field. The UE may use this header to inform the base station about format type change, and the base station may also use the CMR in this field to request the UE to change the frame type.

Figure 18:
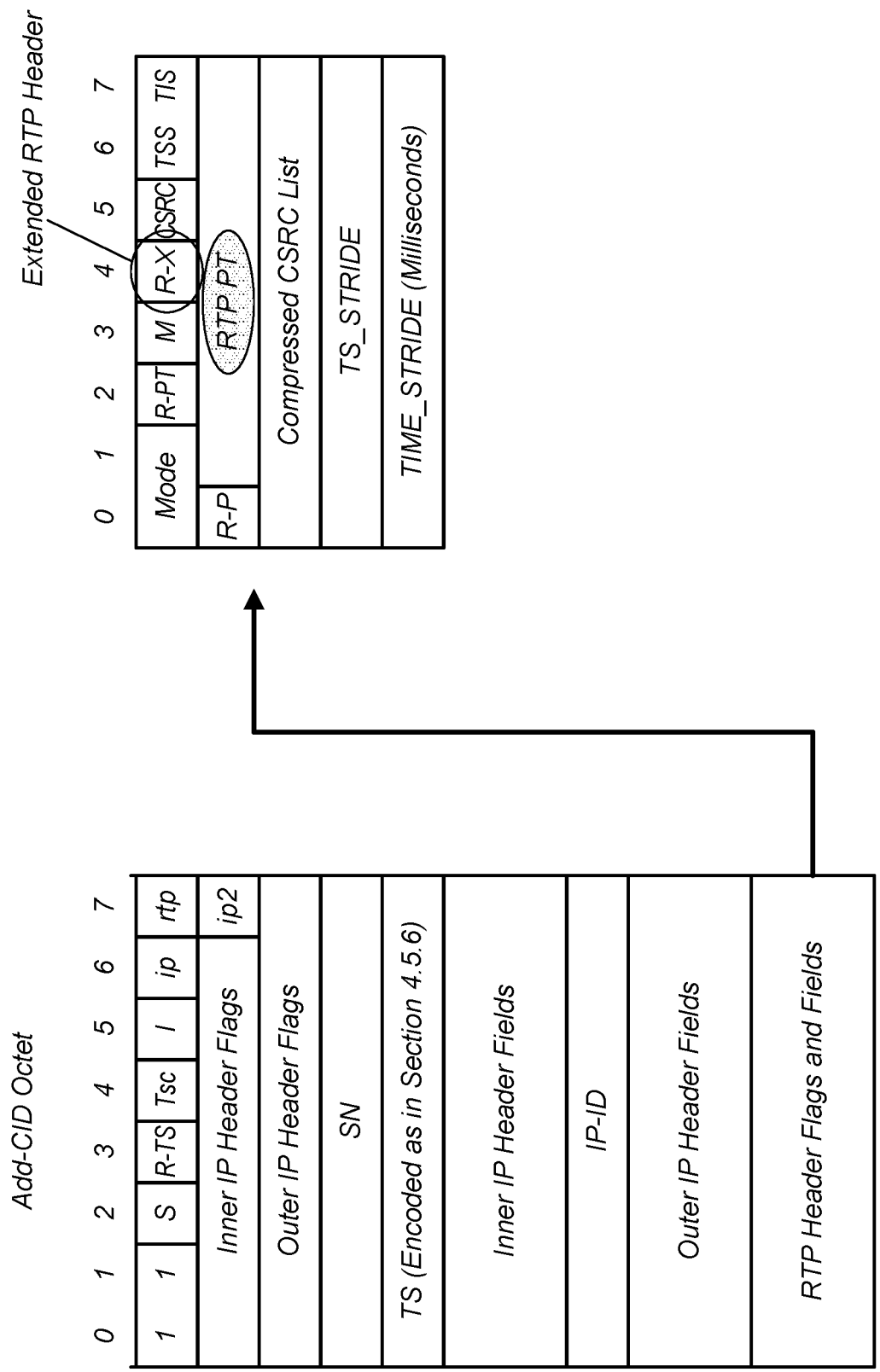
FIG. 18 illustrates use of a standard RTP header using the header flags and fields segment of ROHC UOR-2-EXT3 header to convey frame type and phone type information, according to some embodiments.

FIG. 18 illustrates use of a standard RTP header using the header flags and fields portion of ROHC UOR-2-EXT3 header (expanded on the right hand side in FIG. 18) to convey frame type and phone type information, according to some embodiments. In some instances the UE may change the frame type during a call due to UL quality issues, for example due to UL power limit and/or UL high BLER (Block Error Rate). In these cases the UE may not be transmitting an IR-DYN packet as the UE may not wish to change the ROHC state. The network/base station may also request the UE to change frame type due to various conditions, e.g. whole-cell load, UL/DL RF conditions, and/or UL/DL BLER. Therefore, the UE may use a standard RTP header in the ROHC UOR-2-EXT3 header dynamic segment to update the phone type parameter (illustrated by the circled RTP-PT portion of the expanded RTP Header Flags and Fields segment on the right). The UE and the base station may support RFC 5285, and may use a standard extended RTP header in the ROHC UOR-2-EXT3 header dynamic segment to update the frame type and phone type parameter.

Base Station Response

Figure 19:
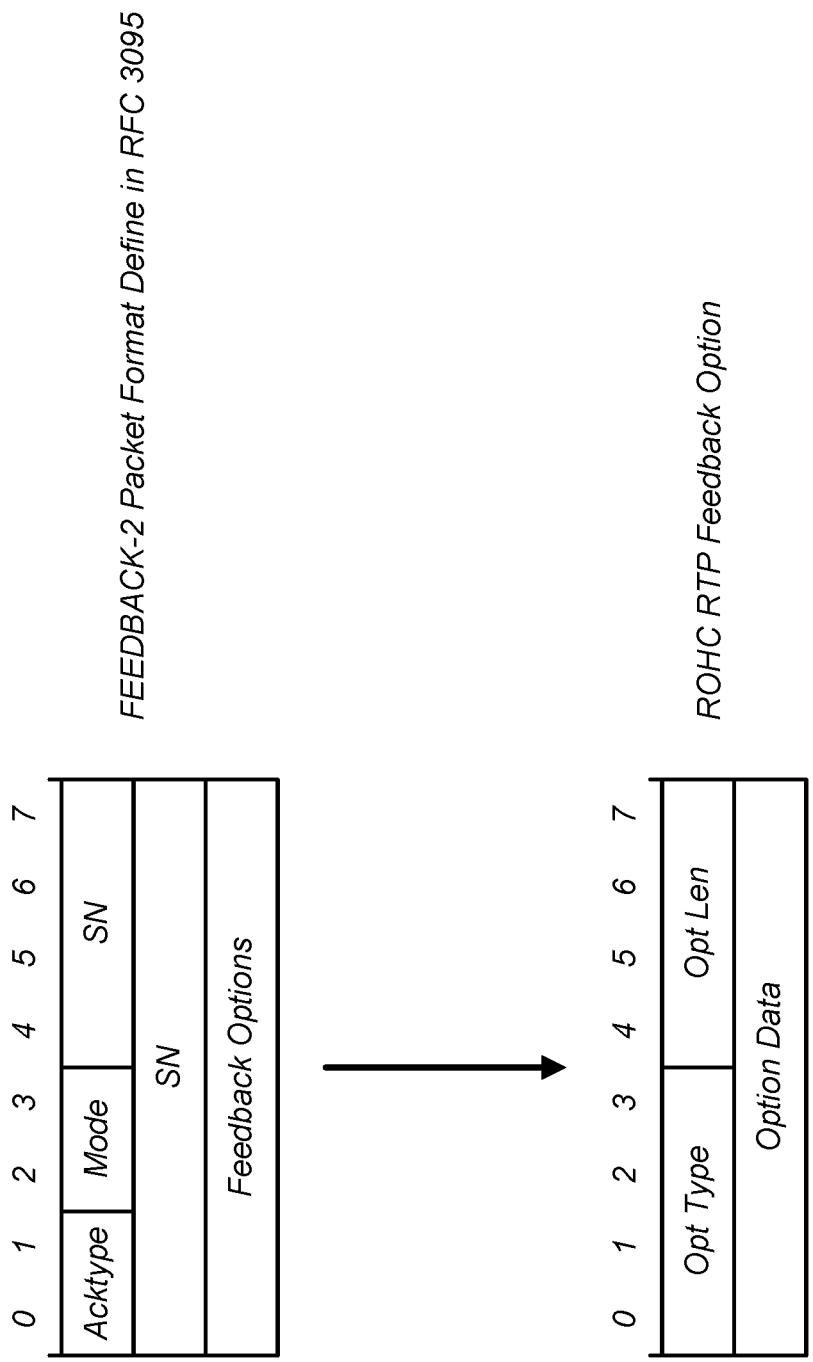
FIG. 19 shows exemplary signaling options for a base station to respond to a mobile device requesting an uplink grant change, according to some embodiments.

FIG. 19 shows exemplary signaling options for a base station to respond to a mobile device requesting an uplink grant change, according to some embodiments. In some embodiments, the base station may either send a response to the UE upon receiving a grant change requested as outlined above, or the base station may not send feedback information specifically directed to the request. The base station/eNB may respond with FEEDBACK-2, and may use a specified (new) acknowledgment type (e.g. more than 7) when sending the response. If the base station does not send feedback, the UE may follow current procedure[s], for example as defined in RFC 3095.

Resource (Grant Change) Request Transmission

FIG. 20 shows an exemplary communication diagram illustrating when the mobile station may transmit grant change (or resource) request information to a base station, according to some embodiments. Phone type and frame type information (as previously described) may be transmitted to the base station at the beginning of an ROHC packet initiated for PDCP (i.e. transmitted in, e.g. IR/IR-DYN). When the phone type or frame type changes during communications, for example during a voice call, the UE may also update the base station in, for example, IR-DYN/UOR-2-TS-EXT3. One example of a frame type change during communications is for example AMR-WB 12.65 changing to 8.85. Thus, as illustrated in FIG. 20, after the ROHC context is established, the UE may send an IR-DYN packet to carry the voice packet and the extended RTP header carrying resource/parameter information to the base station. For instance, the UE may send and IR-DYN packet to the network (base station) to declare a specific frame type, e.g. AMR-WB frame type 2, and may identify its phone type, e.g. it may identify itself as an iPhone™. The UE may resend this packet after a handover, radio link failure, and/or call reestablishment, for example. During VoLTE conversations, the UE may use the ROHC UOR-2-EXT3 packet to deliver the resource request information.

The base station may have different UL grants for a UE's talk spurt and silence, respectively. For example, the respective packet sizes for talk spurts and silence periods may be different, and the intervals may also be different (e.g. 20 ms versus 160 ms, respectively). The ROHC packet UO-0 may be used for voice packet and silence packet, while UO-1-TS, UO-2-TS, UOR-2-TS-EXT3 packets may be used for talk/silence transitions. The ROHC may use these types of packets to update the state of the various (requested UL grant) parameters, and the eNB may obtain and indication from the ROHC packet type and adjust the grant (size) accordingly and without delay.

Resource Parameter Examples

Figure 22:
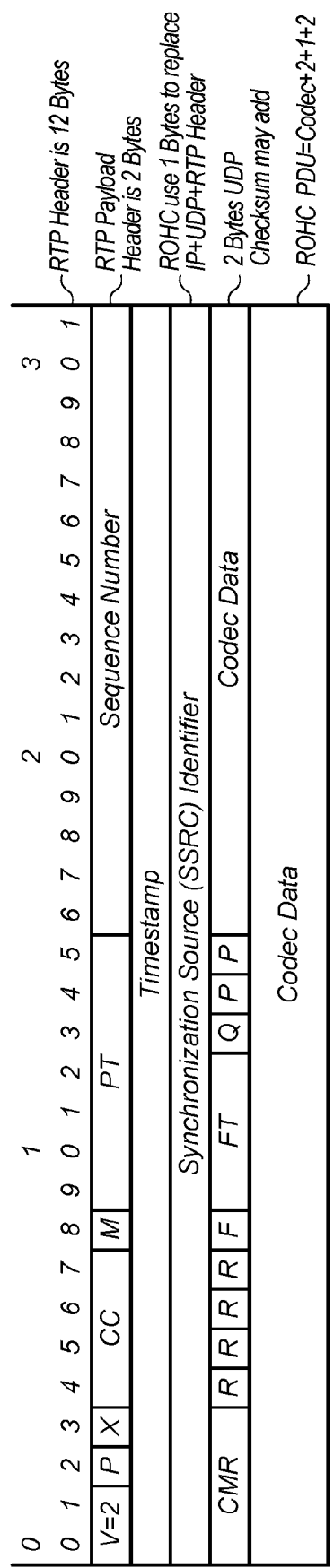
FIG. 22 shows an exemplary RTP packet structure.
Figure 23:
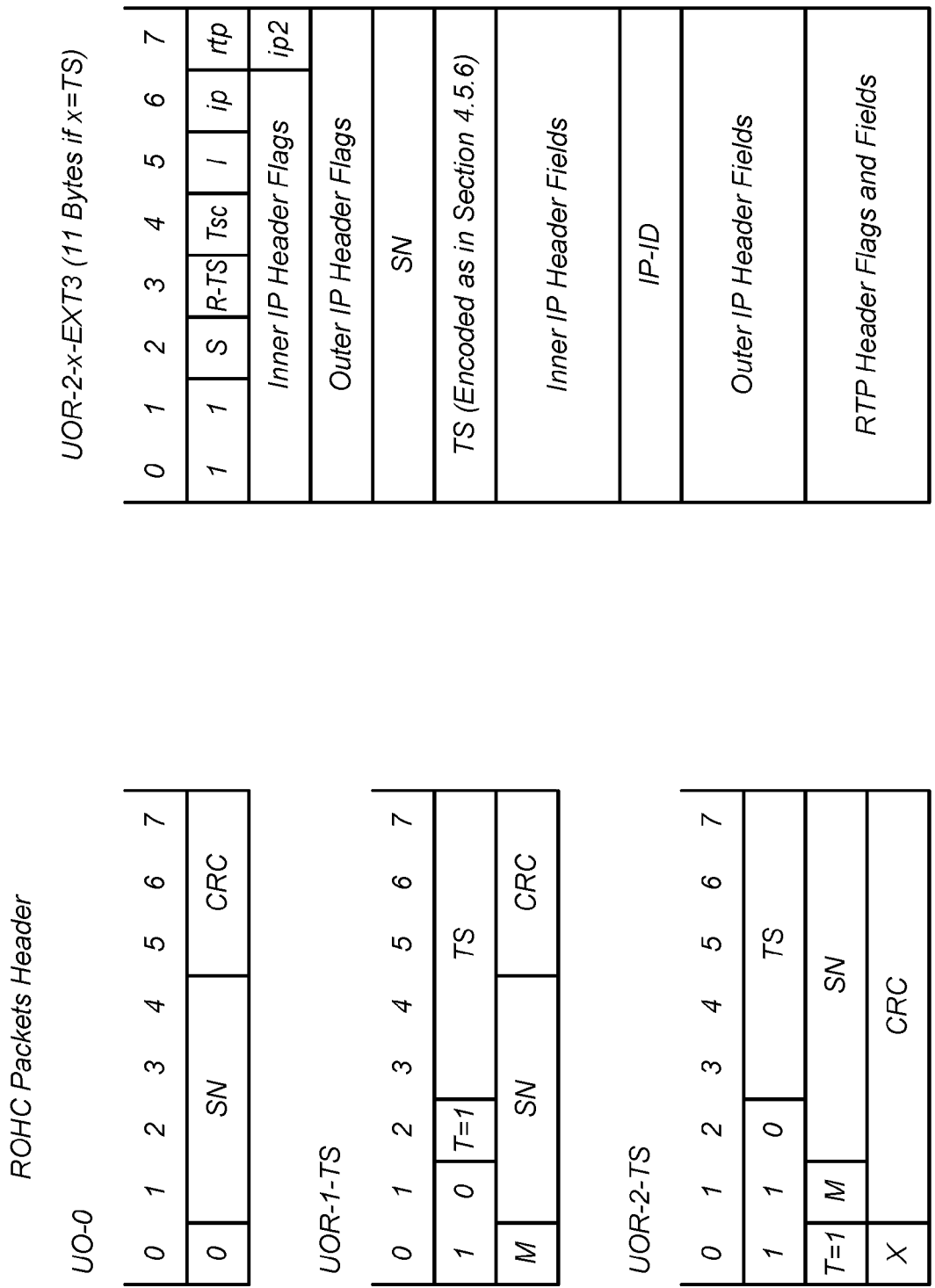
FIG. 23 shows exemplary ROHC packet headers.

FIG. 21 shows an exemplary table illustrating AMR-WB packet size information. When using RTP to carry AMR-WB voice packets, RTP may add 2 bytes of payload header ahead of 33 bytes of codec octets. The RTP header is 16 bytes. FIG. 22 shows an exemplary RTP packet structure. RTP header is 12 bytes, while RTP payload header is 2 bytes. The ROHC uses 1 byte to replace IP+UDP+RTP header. A 2-byte UDP checksum may be added. The ROHC PDU=CODEC+2+1+2. FIG. 23 shows exemplary ROHC packet headers.

Carrying Phone Type Information in VoLTE

In order to save power in VoLTE, a set of C-DRX parameters along with optimization may be used in wireless communications devices. In order to prevent wireless communication devices without this optimization to show performance degradation with the same CDRX settings, when an optimized wireless communication device (UE) has MO/MT VoLTE call, the UE may identify its type to the network/base station, and the network/base station may select the proper C-DRX setting for the UE with the optimization. The type information may be carried in SIP/SDP. However, since SIP/SDP (Session Initiation Protocol/Session Description Protocol) is a message exchange between the IMS (Internet Protocol Multimedia Subsystem) and the UE, and the base station may require an additional message exchange with the IMS CN (core network) to get the UE type. In some embodiments, the UE may carry phone type/vendor information in an ROHC packet. The ROHC packet may be UOR-2-EXT3 packet, and may use RTP header extension specified in RFC 5285, as also previously described above.

Indicating Talk to Silence and Silence to Talk Transitions

In VoLTE deployment, the UE may at times transmit voice packets and silence packets. There are differences between the voice packets and silence packets. Voice packets are created every 20 ms, and silence packets are created every 160 ms. Voice packets are over 40 bytes, while silence packet are less than 15 bytes. Without a clear indication of Voice to Silence, the base station cannot make accurate grants or pre-allocations.

In order to provide more accurate grants and/or pre-allocations, when the UE changes from talk to silence, the UE may send a UOR-2-TS or UO-1 packet to update TS ROHC state or parameters. The NW may use these packets as indication of voice to silence change, and adjust the grant TBS and interval of pre-allocation accordingly. When the UE changes from silence to talk, the UE may send UOR-2-TS packets and/or other packets. The base station may use these packets as an indication of silence to voice change, and adjust the grant TBS and interval/TBS of pre-allocation accordingly.

Further Examples of Improved Operations Through Resource Related Information Transmitted by the UE to the Base Station As previously mentioned, ROHC information and CODEC information may be used to estimate the necessary uplink physical layer TBS. When the UE selects one CODEC, the voice packet size and silence packet size may be fixed. When the UE transitions from silence mode to talk mode, and/or from talk mode to silence mode, the ROHC packet may be used to provide an indication to the base station. Based on above information, the base station may be informed of UE activity (silence or talk), and thus be enabled to make more accurate TBS estimates.

In order for the network to understand the different application requirements (such as requirements for non-real time services) associated with allocation on a default bearer, ROHC may be enabled for IP (Internet Protocol), and the ROHC IPv4/6 generic extension header may be used to exchange the application aware information between the network and the UE.

Oftentimes the UE transmits the PUSCH (Physical Uplink Shared Channel) in VoLTE at higher than necessary power levels, which results in wasted UE power. If the UE were to reduce the transmit power based on some measured metric (such as BLER) without informing the base station, the base station may continue transmitting a TPC (Transmit Power Control) command instructing the UE to increase power, possibly resulting in additional side effects. Accordingly, an extended RTP header may be used to transmit power clipping information to the base station. Upon receiving this information, the base station may issue a more appropriate, corresponding response, allowing the UE to further reduce power if applicable.

In some embodiments, a C-DRX setting with RF condition may be adapted in TDD-VoLTE. Some current TDD-VoLTE deployments recommend use of a particular set of C-DRX parameters. For example, the following C-DRX parameters may be used during C-DRX communications for all RF conditions:

On-Duration=4 ms,
  Inactive Timer=4 ms,
  Retransmit time=4,
  C-DRX cycle=40 ms.

In many instances under good RF conditions these specified parameters are appropriate. However, there may be some conditions under which the operations according to those specified parameters result in inefficient transmissions. For example, with a UL/DL configuration of (2, 7), without TTIB (Transmit Time Interval Bundling) support, when the UE is in weak coverage, the base station may only provide several small grants to carry whole voice packets in 40 ms. In case of weak coverage due to RF conditions (for any of a number of reasons), when the base station performs RLC segmentation for the UE with several small grants, the second or third grant is oftentimes not issued due to a short inactivity timer. This can be due to the base station having to schedule the grants based on the BSR, which results in the base station taking too long to schedule data for the UE, and by the time the base station is ready to schedule the data the inactivity timer has already expired. This may have serious effects on VoLTE KPI (Key Performance Indicators), e.g. on accessibility, retainability, integrity, availability, and mobility to name a few.

Several solutions have been attempted to solve the above described issue. One solution introduces a longer inactivity timer, which has the undesirable side effect of wasted UE power under good RF conditions. Another solution introduces CQI-based C-DRX reconfiguration. This involves the base station reconfiguring C-DRX with a longer inactivity timer when a CQI (Channel Quality Indicator) report from the UE is indicative of a lower value than a specified threshold for specific period of time. When the CQI is higher than the threshold for the specific period, the base station configures another C-DRX with a standard inactivity timer value (e.g. 4 ms). This solution has the undesirable side effect of causing more signaling from the base station and adding signaling processing load.

Accordingly, in one set of embodiments, the inactivity timer may be reconfigured/changed similar to the solutions described above but only under certain RF conditions, without the use of OTA (Over the Air) signaling, thereby not adding signaling load. Instead, the RTP extension header in an ROHC packet may be used by the UE to transmit/signal a simple message to the base station, indicating an inactivity timer duration preference. For example, the UE may transmit a 'request long inactivity timer' message (or long inactivity timer request) or a 'request short inactivity timer' message (short inactivity timer request).

In some embodiments, a UE based adaptive HARQ retransmit operation may be introduced. During VoLTE calls, under unfavorable channel conditions the UE typically uses HARQ retransmit to combine redundancy packets. The HARQ retransmit times are configured by the network/base station. Under certain conditions the retransmit success rate can be varied, and can easily deteriorate. According to various field tests, the fail rate for a first retransmit can reach 29%, with the fail rate for a second retransmit at 23%, and the fail rates for a third, fourth and fifth transmit reaching 40%, 48%, and 56%, respectively. If the retransmit fail rate is high for third and fourth even fifth retransmits in VoLTE, the UE is wasting power and fails to gain any benefit from the retransmit attempts. Therefore, discarding retransmits with high fail rates in VoLTE can save the UE power.

Accordingly, in one set of embodiments, the UE may calculate the transmit fail rate of first, second, third . . . "n" retransmit attempts, where n is the maximum number of retransmit attempts configured by the network/base station. If the retransmit failure rate is higher than a specified threshold value on third, fourth . . . n retransmit attempts, the UE may stop retransmitting on n, n−1 . . . fourth, third retransmit attempts. The UE may further use the ROHC packet header to notify the network/base station, which may cause the network to change the HARQ parameters such that it reduces the number of retransmit attempts.

Figure 5:
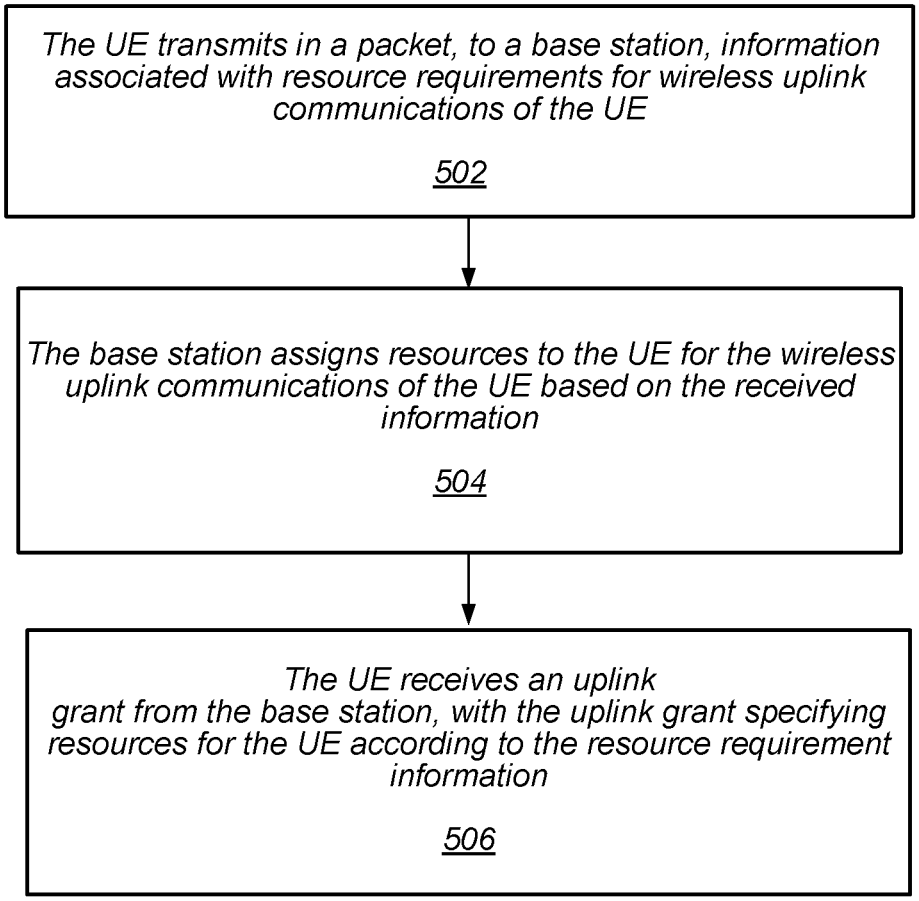
FIG. 5 shows an exemplary flow diagram illustrating communication between a UE device and a base station, according to some embodiments.

Wireless Communication Between a UE and a Base Station with Improved Resource Allocation FIG. 5 shows an exemplary flow diagram of an improved method for wireless cellular communications according to some embodiments. In order to facilitate more efficient resource allocation and UL grants, the UE may transmit in a packet, to a base station, information associated with resource requirements corresponding to wireless uplink communications of the UE (502). The base station (or network) may then assign resources to the UE for the wireless uplink communications of the UE based on the received information (504). The UE may then receive an uplink grant from the base station, with the uplink grant specifying resources to be used by the UE during uplink communication according to the (resource requirement) information previously transmitted by the UE to the base station (506).

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

In some embodiments, an apparatus may include a processing element configured to cause a wireless communication device to generate a notification of an expected data transmission pattern allocated by a data transfer mechanism for first communications performed by the wireless communication device according to a first radio access technology (RAT). The processing element may also cause the wireless communication device to have an algorithm to be executed responsive to the notification, where the execution of the algorithm causes second communications performed by the wireless communication device according to a second RAT to be performed based on the expected data transmission pattern.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus comprising:
   a processing element configured to cause a wireless communication device to:
      transmit, in a packet to a base station, resource configuration information indicating resource requirements of the wireless communication device for wireless uplink communications of the wireless communication device; and
      receive an uplink grant from the base station, wherein the uplink grant specifies resources to be used by the wireless communication device during the uplink communications, wherein the resources are specified by the uplink grant based on the resource requirements indicated in the resource configuration information previously transmitted by the wireless communication device to the base station.

2. The apparatus of claim 1, wherein the resource configuration information comprises at least one of the following:
   frame type information;
   phone type information; or
   payload type information.

3. The apparatus of claim 2, wherein the payload type information comprises coding/decoding (CODEC) information.

4. The apparatus of claim 1, wherein the packet is a Robust Header Compression (ROHC) IR-DYN type packet.

5. The apparatus of claim 4, wherein the resource configuration information is at least partially comprised in a Real-time Transport Protocol (RTP) header of the ROHC IR-DYN packet.

6. The apparatus of claim 1, wherein the packet is a Robust Header Compression (ROHC) UOR-2-EXT3 type packet.

7. The apparatus of claim 1, wherein the processing element is further configured to cause the wireless communication device to retransmit the packet to the base station in response to one or more of the following:
a handover;
a radio link failure; or
reestablishment of connectivity.

8. The apparatus of claim 1, wherein the processing element is further configured to cause the wireless communication device to transmit the packet in response to a voice call being initiated with the wireless communication device.

9. The apparatus of claim 1, wherein the processing element is further configured to cause the wireless communication device to transmit the packet during a voice call in response to the wireless communication device adjusting certain resource configuration parameters.

10. A wireless communication device comprising:
radio circuitry configured to facilitate wireless communications of the wireless communication device; and
control circuitry coupled to the radio circuitry and configured to interoperate with the radio circuitry to cause the wireless communication device to:
transmit, in a packet to a base station, resource configuration information indicating resource requirements of the wireless communication device for wireless uplink communications of the wireless communication device; and
receive, from the base station, an uplink grant for the wireless uplink communications, wherein resources specified in the uplink grant and used by the wireless communication device during the uplink communications in response to the uplink grant have been assigned according to the resource requirements indicated in the resource configuration information previously transmitted by the wireless communication device to the base station.

11. The wireless communication device of claim 10, wherein the information comprises at least one of the following:
frame type;
phone type;
payload type;
application aware information;
power clipping information;
inactivity timer duration request; or
retransmit failure notification.

12. The wireless communication device of claim 10, wherein the packet is a Robust Header Compression (ROHC) packet.

13. The wireless communication device of claim 12, wherein the information is at least partially comprised in at least one of the following:
a Real-time Transport Protocol (RTP) header of an IR-DYN type ROHC packet;
an IPv4/6 Generic extension header of an ROHC packet; or
a UOR-2-EXT3 type ROHC packet.

14. The wireless communication device of claim 10, wherein the control circuitry is further configured to interoperate with the radio circuitry to cause the wireless communication device to retransmit the packet to the base station in response to one or more of the following:
a handover;
a radio link failure; or
reestablishment of connectivity.

15. The wireless communication device of claim 10, wherein the control circuitry is further configured to interoperate with the radio circuitry to cause the wireless communication device to transmit the packet in response to one or more of the following:
a voice call with the wireless communication device being initiated; or
the wireless communication device adjusting certain resource configuration parameters during another voice call.

16. A non-transitory memory medium storing programming instructions executable by a processing element to cause a wireless communication device to:
transmit, in a packet to a base station, configuration information indicating resource requirements of the wireless communication device for wireless uplink communications of the wireless communication device; and
receive, from the base station, an uplink grant for the wireless uplink communications, wherein resources specified in the uplink grant and used by the wireless communication device during the uplink communications in response to the uplink grant have been assigned according to the resource requirements indicated in the resource configuration information previously transmitted by the wireless communication device to the base station.

17. The non-transitory memory medium of claim 16, wherein the information comprises at least one of the following:
frame type;
phone type;
payload type;
application aware information;
power clipping information;
inactivity timer duration request; or
retransmit failure notification.

18. The non-transitory memory medium of claim 16, wherein the information is at least partially comprised in at least one of the following:
a Real-time Transport Protocol (RTP) header of an IR-DYN type ROHC packet;
an IPv4/6 Generic extension header of an ROHC packet; or
a UOR-2-EXT3 type ROHC packet.

19. The non-transitory memory medium of claim 16, wherein the programming instructions are further executable by the processing element to cause the wireless communication device to retransmit the packet to the base station in response to one or more of the following:
a handover;
a radio link failure; or
reestablishment of connectivity.

20. The non-transitory memory medium of claim 16, wherein the programming instructions are further executable by the processing element to cause the wireless communication device to transmit the packet in response to one or more of the following:
   a voice call with the wireless communication device being initiated; or
   the wireless communication device adjusting certain resource configuration parameters during a voice call.

\* \* \* \* \*